United States Patent [19]

Gerber

[11] Patent Number: 4,792,175

[45] Date of Patent: Dec. 20, 1988

[54] WINDSHIELD ASSEMBLY FOR GOLF CARTS

[75] Inventor: Curtis E. Gerber, Tampa, Fla.

[73] Assignee: Tampa G Manufacturing Co., Tampa, Fla.

[21] Appl. No.: 20,962

[22] Filed: Mar. 3, 1987

[51] Int. Cl.⁴ .............................................. B60J 1/02
[52] U.S. Cl. ..................................... 296/79; 296/84.1;
296/96.21; 49/464; 49/465; 280/DIG. 5
[58] Field of Search .................. 296/78 R, 78 A, 78.1,
296/79, 84 R, 84 N, 84 A, 201; 49/464, 465;
280/289 S, DIG. 5

[56] References Cited

U.S. PATENT DOCUMENTS

| | | | |
|---|---|---|---|
| 1,294,241 | 2/1919 | Crossley | 296/86 |
| 1,403,488 | 1/1922 | Crowell | 296/86 |
| 1,607,489 | 11/1926 | Springstead | 296/95 R |
| 1,944,160 | 1/1934 | Barker | 296/84 R |
| 2,141,442 | 12/1938 | Mead et al. | 98/2.12 |
| 3,829,152 | 8/1974 | Hobbs | 296/78 R |
| 3,894,305 | 7/1975 | Krenzler | 296/84 A X |
| 3,958,826 | 5/1976 | Upton | 296/78 R |
| 4,013,315 | 3/1977 | West | 280/DIG. 5 |
| 4,014,589 | 3/1977 | Yerkey | 296/78 R |
| 4,343,503 | 8/1982 | Samuelson et al. | 296/84 D |
| 4,488,750 | 12/1984 | Gerber | 296/78 R |

Primary Examiner—Dennis H. Pedder
Attorney, Agent, or Firm—Dominik, Stein, Saccocio, Reese, Colitz & Van Der Wall

[57] ABSTRACT

A rigid windshield for a golf cart comprising two substantially identical window panes each having an upper inwardly turned edge and a lower outwardly turned edge. Removable fasteners are affixed to opposing side edges of each window pane allowing the window panes to be affixed to the vertical roof supports of the golf cart with one window pane being positioned planarly over the other such that the lower outwardly turned edge of the upper window pane mates with the upper inwardly turned edge of the lower window pane. When removed, the window panes may be stacked one on top of the other and conveniently stored underneath the roof structure of the golf cart.

2 Claims, 1 Drawing Sheet

U.S. Patent    Dec. 20, 1988    4,792,175
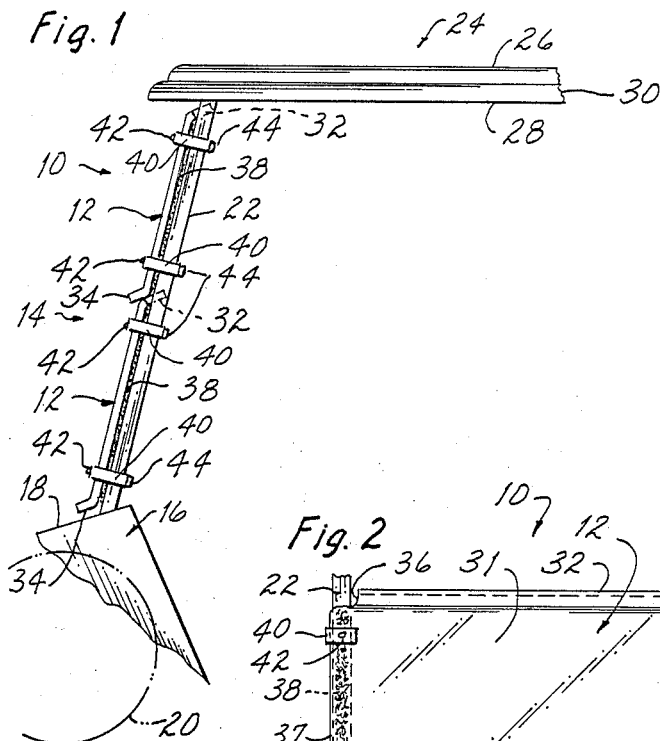
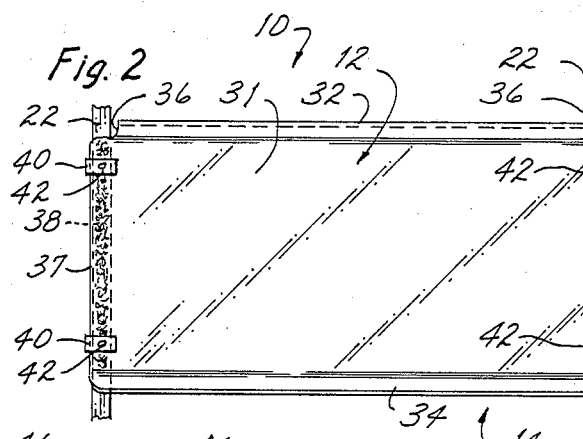
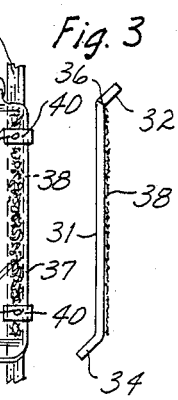
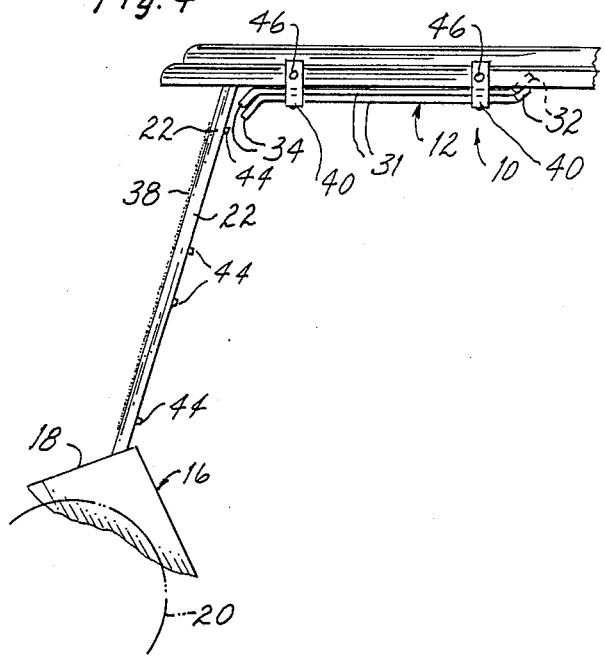

WINDSHIELD ASSEMBLY FOR GOLF CARTS

BACKGROUND OF THE INVENTION

1. Field of the Invention

This invention relates to golf carts. More particularly, this invention relates to windshields for golf carts which are designed to be easily installed and removed from the golf cart.

2. Description of the Background Art

Presently, there exist many types of windshields for vehicles and the like. The most predominant type of windshield is a fixed windshield which is sealingly mounted within the window framework of a vehicle. Other types of windshields consist of folding or pivotal types in which the windshield is mounted within a frame which pivots upwardly and downwardly into position in front of the driver of the vehicle.

In regard to golf carts in particular, fixed windshields have been have been disfavored because they obstruct the free flow of air and feeling of openness to the occupants of the golf cart during good weather when the function of the windshield is not needed to deflect precipitation such as rainfall. Consequently, golf cart windshields which presently exist are typically pivotably or removably designed so that the windshield may be pivoted downwardly or upwardly or removed from the golf cart when unneeded and then quickly moved into position or installed on the golf cart at the time of imminent rainfall.

For example, U.S. Pat. No. 3,829,152 discloses a vehicle windshield assembly adapted for use in conjunction with a golf cart in which a sheet of clear flexible material is snapped onto the front edge of the roof of a golf cart and then positioned downwardly along the front of the golf cart to be removably fastened to the undercarriage of the golf cart by means of straps. A pair of reinforcing strips are formed within the clear plastic along the top and middle portions thereof to provide stability to the windshield thereby minimizing flapping of the flexible material in the wind. U.S. Pat. No. 4,014,589 discloses another flexible windshield for a golf cart which is also composed of clear flexible material and designed to be removably fastened to the roof and front undercarriage of the golf cart. Finally, U.S. Pat. No. 3,958,826 discloses still another flexible windshield for a golf cart which is rolled up onto a springloaded roller affixed to the front edge of the roof of the golf cart. During use, the clear flexible material is pulled from the roller assembly, much like a window shaft, and then fastened to the lower front edge of the golf cart.

Notwithstanding the utility and ease of use of the above-mentioned flexible type windshields, it has still remained desirous to utilize rigid windows composed of rigid glass or plastic removably mounted to the front of the golf cart. U.S. Pat. No. 4,343,503 discloses such a rigid snap-on windshield for a golf cart as including a sheet of clear rigid material having channel fasteners on opposing sides thereof designed to removably snap onto the front vertical supports of the roof of the golf cart. Such a windshield functions suitably well to deflect precipitation. However, such a large sheet of rigid material cannot be easily stored on or within the golf cart during nonuse. Hence, the golfer must decide whether to mount the windshield on the golf cart before playing. The uncertainities of weather conditions, including the chance of actual precipitation, result in the golfer being unable to accurately determine whether the windshield will be needed that day.

Therefore, it is an object of this invention to provide an apparatus which overcomes the aforementioned inadequacies of the prior art devices and provides an improvement which is a significant contribution to the advancement of the windshield art.

Another object of this invention is to provide a windshield for a golf cart and similar vehicles composed of a sheet of clear rigid material affixed to the front opening of a golf cart to protect the occupants from precipitation.

Another object of this invention is to provide a rigid clear windshield for a gold cart or the like which may be quickly and easily removed from the front opening of a golf cart and conveniently stored within the golf cart without obstructing the ingress or egress of the occupants from the golf cart or otherwise obstructing the view of the occupants.

Another object of this invention is to provide a removable fixed windshield for a golf cart which is economical to manufacture.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a rigid windshield for a golf cart or similar vehicle designed to be removably mounted to the vertical roof supports about the front or other opening of the vehicle. More particularly, the rigid windshield of the invention comprises two substantially identical window panes each having an upper inwardly turned edge and a lower outwardly turned edge. Removable fasteners are affixed to opposing sides of each window pane allowing the window panes to be affixed to the vertical roof supports of the cart with one window pane being positioned over the other such that the lower outwardly turned edge of the upper window pane mates with the upper inwardly turned edge of the lower window pane thereby preventing precipitation from flowing through the juncture between the two window panes. Furthermore, the upper inwardly turned edge of the upper window pane curves inwardly under the roof of the golf cart to prevent precipitation from flowing therethrough. Likewise, the lower outwardly turned edge of the lower window pane curves over the hood of the golf cart to prevent precipitation from flowing therethrough.

During periods of nonprecipitation, each window pane is quickly removed from the vertical roof supports of the golf cart by simply unfastening the straps from such supports. Once removed, the window panes may be stacked one on top of the other with the upper and lower edges thereof being aligned so as to mesh together during stacking. This stacked arrangement may then be removably fastened to the underside of the roof structure by the use of the same straps for temporary storage during good weather. The storage of the window panes directly underneath the roof of the golf cart assures that the window panes will not obstruct the view of the occupants of the golf cart or otherwise interfere with the occupants' ingress and egress from the cart. Moreover, during the imminence of precipitation, the window panes may be quickly and easily removed from the underside of the roof structure and refastened to the vertical roof supports about the front opening of the cart to again form a clear rigid windshield to divert precipitation. Thus, it can be appreciated that the windshield of the invention includes all of the advantages of the aforementioned golf cart windows while providing a rigid window which may be quickly and easily removed and stored underneath the roof structure of the golf cart away from interference with the occupants.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a partial side view of a golf cart having the window of the invention mounted about the front opening thereof;

FIG. 2 is a front view of a window pane of the invention illustrating the upper inwardly turned edge thereof and the lower outwardly turned edge thereof;

FIG. 3 is a right side view of FIG. 2 more particularly illustrating the curvature of the upper and lower edges of the window pane; and FIG. 4 is another partial side view of a golf cart illustrating the window panes of the invention removed from the front opening of the golf cart and stored underneath the roof structure of the cart.

Similar reference characters refer to similar parts throughout the several views of the drawings.

DETAILED DESCRIPTION OF THE PREFERRED EMBODIMENT

. As shown in FIGS. 1-3, the windshield assembly 10 of invention comprises a plurality of window panes 12 designed to be affixed to the front opening 14 of a golf cart 16 or similar vehicle to deflect precipitation from flowing through the opening 14 thereof. As shown in FIG. 1, a typical golf cart 16 comprises a front hood 18 positioned over a pair of front wheels 20. A pair of upstanding tubular roof supports 22 extends verticaly upwardly from hood 18 to define the window opening 14 of the cart 16. A roof structure, generally indicated by numeral 24, is affixed to the uppermost end of the roof supports 22 to be supported thereby along with similar roof supports (not shown) extending upwardly from the rearward portion of the cart 16. It is noted that in some golf carts 16, the upstanding roof supports 22 actually comprise a single tubular member which is formed in a generally U-shaped configuration and then inverted allowing the ends thereof to be mounted to the hood 18 of the cart 16 and allowing the roof structure 24 to rest upon and be affixed to the horizontal portion of the inverted U-shaped configuration. It is also noted that a typical roof structure 24 comprises a substantially flat uppermost member 26 having a downwardly turned edge 28 about its periphery. An inverted L-shaped rim 30 is formed about the entire periphery of the edge 28. Typically, the upper most end of the roof supports 22 are affixed to the horizontal portion of the rim 30 to support the roof structure 24. Indeed, the roof supports 22 are typically spaced apart from one another on opposing sides of the cart 16 to be aligned with rim 30 of the roof structure 24.

Referring specifically to FIGS. 2 and 3, each window pane 12 of the invention comprises a generally flat configuration 31 having an upper inwardly turned edge 32 and a lower outwardly turned edge 34. Both edges 32 and 34 are curved in an arcuate manner to provide a streamlined appearance as shown most clearly in FIG. 3. However, the upper inwardly turned edge 32 includes a reduced width than that of the planar portion of the pane 12 thereby forming notches 36 in the upper corners of the pane 12. These notches 36 allow the upper inwardly turned edge 32 to fit between the upstanding roof supports 22 while allowing the planar portion 31 of the pane 12 to be seated over the outermost edge of the roof supports 22. Thus, the width of the upper inwardly turned edge 32 is preferably appreciably narrower than the distance between the upstanding roof supports 22 to allow the inwardly turned edge 32 to fit therebetween.

The window assembly 10 of the invention further includes means for removably fastening the window panes 12 to the upstanding roof supports 22. More particularly, the fastening means preferably comprises hook and loop fastener means 38, such as that sold under the registered trademark "Velcro", which is adhered to the opposing outermost sides 37 of the window panes 12 and the front of the upstanding roof supports 22 such that each window pane 12 is removably fastened to the upstanding roof supports 22 by means of the hook and loop fastener 38. For added security, a pair of straps 40 are rigidly fastened to the opposing sides 37 of the window panes 12 by means of a rivet 42 or the like. Straps 40 each include a snap 44 designed to snap onto a corresponding snap 44 permanently affixed to the upstanding roof support 22.

As shown in FIG. 1, the windshield assembly 10 is preferably mounted about the opening 14 of the cart 16 by first positioning a window pane 12 to the lower portion of the upstanding roof supports 22 such that its lower outwardly turned edge 34 is positioned immediately adjacent to the hood 18 of the cart 16. The second window pane 12 is then mounted to the upper portion of the opening 14 with its lower outwardly turned edge 34 positioned immediately adjacent to the upper inwardly turned edge 32 of the lower pane 12 and with its upper inwardly turned edge 32 positioned underneath the rim 30 of the roof structure 24. In this manner, it should be appreciated that any precipitation impinging upon the window assembly 10 will be deflected therefrom and, because of the mating contours of the edges 32 and 34 with each other and with the roof structure 24 and the hood 18, no precipitation will enter therethrough at such areas. The occupants of the cart 16 will, therefore, be protected.

During periods of good weather, the windshield assembly 10 may be quickly and easily removed for mounting from the roof support 22 by unfastening straps 40 and removing the upper and then the lower panes 12. Once removed, the panes 12 may be stacked on top of one another with their inwardly turned edges 32 mating together and with their outwardly turned edges 34 similarly mating together. This stacked arrangement of the panes 12 may then be positioned underneath the roof structure 24 and fastened to the rim 30 by means of the straps 40 which snap onto snaps affixed to the rim 30 of the roof 24. It is noted that the notches of 36 formed by the reduced width inwardly turned edges 32 allow the inwardly turned edges 32 to fit into the space defined by the rim 30. Thus, only a rounded edge is facing the occupants of the cart 16 thereby preventing inadvertent injury to the occupants in the event that the occupants inadvertently come into contact with the edge. Likewise, the outwardly turned edges 34 provide a streamlined configuration which seats within the corner formed between the upstanding roof supports 22 and the roof structure 24 thereby also preventing inadvertent injury to the occupants of the cart 16. Removal of the stacked window panes 12 from underneath the roof structure 24 is accomplished simply by unsnapping straps 40 from the snaps 46 on the roof structure 24, and then repositioning the window panes 12 about the opening 14 of the front of the golf cart 16 in the manner described above.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangment of parts may be resorted to without departing from the spirit of the invention.

Now that the invention has been described,

What is claimed is:

1. A window assembly for a golf cart having a roof structure with depending side rims, the roof structure being supported above by spaced apart upstanding roof supports affixed between a golf cart hood and the roof structure to define a front window opening, comprising in combination:

a plurality of window panes, each said window pane having a width appreciably wider than a distance between the spaced apart unstanding roof supports and including an integrally formed and transparent substantially planar portion with an inner and outer surface and an upper inwardly turned edge, a lower outwardly turned edge, and a pair of opposing side edges, said upwardly turned edge including a width narrower than the distance between said upstanding roof supports to allow said upwardly turned edge to fit between the upstanding roof supports;

means for removably affixing said opposing side edges of each said window pane to the respective upstanding roof supports, said window panes being positioned one above another with said planar portions substantially coplanar and said lower outwardly turned edge of the upper said window pane mating against said upper inwardly turned edge of the lower said window pane to prevent precipitation from flowing therethrough, said means for removably affixing said window panes to the upstanding roof supports comprising fastener means affixed to said opposing side edges of each of said window panes for removable fastening with corresponding fasteners mounted along a front edge of the upstanding roof supports; and means for securing said window panes removed from about the window opening and stacked in parallel relationship one on top of another to a position underneath the roof structure, said means for securing said stacked window panes underneath said roof structure comprising a plurality of straps affixed to the lowermost said window pane of said stacked window panes and to said roof structure allowing removal of said stacked window panes from underneath said roof structure.

2. The windshield assembly as set forth in claim 1, wherein said fastener means comprises a hook and loop fastener means.

* * * * *